US012457201B2

(12) United States Patent
Ferland et al.

(10) Patent No.: US 12,457,201 B2
(45) Date of Patent: Oct. 28, 2025

(54) METHOD AND SYSTEM FOR PRIVACY PRESERVING INFORMATION EXCHANGE BASED ON AGGREGATING MASKED VECTORS FROM LOCAL PARTIES

(71) Applicant: Telefonaktiebolaget LM Ericsson (publ), Stockholm (SE)

(72) Inventors: Nicolas Ferland, Santa Clara, CA (US); James Donald Reno, Scotts Valley, CA (US); Subramanian Iyer, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 617 days.

(21) Appl. No.: 17/797,221

(22) PCT Filed: Apr. 16, 2020

(86) PCT No.: PCT/IB2020/053635
§ 371 (c)(1),
(2) Date: Aug. 3, 2022

(87) PCT Pub. No.: WO2021/161079
PCT Pub. Date: Aug. 19, 2021

(65) Prior Publication Data
US 2023/0046255 A1    Feb. 16, 2023

(51) Int. Cl.
*H04L 9/40*     (2022.01)
*G06N 20/00*   (2019.01)

(52) U.S. Cl.
CPC ......... *H04L 63/0414* (2013.01); *G06N 20/00* (2019.01); *H04L 63/0428* (2013.01)

(58) Field of Classification Search
CPC ............. H04L 63/0428; H04L 63/0414; G06F 21/6254; G06F 21/602; G06F 21/6245
See application file for complete search history.

(56) References Cited

U.S. PATENT DOCUMENTS

| 6,546,389 B1 * | 4/2003 | Agrawal | G06Q 30/02 |
| | | | 707/999.102 |
| 6,931,403 B1 * | 8/2005 | Agrawal | G06F 16/9535 |
| | | | 707/999.009 |

(Continued)

FOREIGN PATENT DOCUMENTS

CN           107871160 A       4/2018

OTHER PUBLICATIONS

F. Knirsch, G. Eibl and D. Engel, "Error-Resilient Masking Approaches for Privacy Preserving Data Aggregation," in IEEE Transactions on Smart Grid, vol. 9, No. 4, pp. 3351-3361, Jul. 2018. (Year: 2018).*
M. Lecuyer, R. Spahn, R. Geambasu, T.-K. Huang and S. Sen, "Pyramid: Enhancing Selectivity in Big Data Protection with Count Featurization," 2017 IEEE Symposium on Security and Privacy (SP), San Jose, CA, USA, 2017, pp. 78-95. (Year: 2017).*
Eigner, Fabienne, et al. "Differentially private data aggregation with optimal utility." Proceedings of the 30th Annual Computer Security Applications Conference. 2014, pp. 316-325. (Year: 2014).*

(Continued)

*Primary Examiner* — Kari L Schmidt
(74) *Attorney, Agent, or Firm* — NICHOLSON DE VOS WEBSTER & ELLIOTT LLP

(57) ABSTRACT

Methods and system for privacy preserving information exchange in a network of electronic devices are disclosed. In one embodiment, a method is implemented in an electronic device to serve as a local party for information exchange between the local party and another electronic device to serve as an aggregator. The method includes storing a plurality of values in a 2D vector, where a first dimension of the 2D vector is based on the number of values, and where each position in the first dimension has one unique value. The method further includes transmitting the 2D vector to the aggregator with masking for the aggregator to prevent the aggregator from decoding the 2D vector, where aggregating the masked 2D vector with masked 2D vectors from other local parties allows decoding of the aggregated 2D vector.

17 Claims, 15 Drawing Sheets

(56) References Cited

U.S. PATENT DOCUMENTS

| | | | | |
|---|---|---|---|---|
| 9,002,007 | B2* | 4/2015 | Nabeel | H04L 9/008 |
| | | | | 713/168 |
| 11,055,492 | B2* | 7/2021 | Bhowmick | G06N 5/025 |
| 11,080,423 | B1* | 8/2021 | Kassam-Adams | G16H 15/00 |
| 11,314,884 | B2* | 4/2022 | Oqaily | H04L 9/14 |
| 11,562,230 | B2* | 1/2023 | Mohassel | G06N 3/084 |
| 11,671,241 | B2* | 6/2023 | Ganguly | H04L 9/0643 |
| | | | | 706/20 |
| 12,131,231 | B2* | 10/2024 | Ong | G06F 18/214 |
| 2010/0017870 | A1* | 1/2010 | Kargupta | H04L 63/1408 |
| | | | | 709/201 |
| 2018/0218171 | A1* | 8/2018 | Bellala | G06F 21/6254 |
| 2018/0219842 | A1* | 8/2018 | Bellala | H04L 67/12 |
| 2018/0373882 | A1* | 12/2018 | Veugen | H04L 9/0869 |
| 2019/0138934 | A1 | 5/2019 | Prakash et al. | |
| 2019/0378046 | A1* | 12/2019 | Tanaka | G06N 20/20 |
| 2019/0379642 | A1* | 12/2019 | Simons | H04L 63/0281 |
| 2020/0311300 | A1* | 10/2020 | Callcut | G06N 5/02 |
| 2020/0356858 | A1* | 11/2020 | Hegde | G06N 3/047 |
| 2020/0382273 | A1* | 12/2020 | Vald | G06N 5/01 |
| 2020/0382553 | A1* | 12/2020 | Savalle | G06N 20/00 |
| 2020/0387777 | A1* | 12/2020 | Avestimehr | G06N 20/20 |
| 2021/0019556 | A1* | 1/2021 | Ganguly | G06F 18/24137 |
| 2021/0117868 | A1* | 4/2021 | Sriharsha | G06N 20/20 |
| 2021/0174243 | A1* | 6/2021 | Angel | H04L 9/083 |
| 2022/0269816 | A1* | 8/2022 | Qian | G06F 21/6245 |
| 2022/0351090 | A1* | 11/2022 | Tian | G06N 20/20 |
| 2022/0366083 | A1* | 11/2022 | Parlak | H04L 63/0428 |
| 2023/0070824 | A1* | 3/2023 | Korwin-Gajkowski | |
| | | | | H04W 4/38 |
| 2025/0124274 | A1* | 4/2025 | Pierquin | G06N 3/0475 |

OTHER PUBLICATIONS

Liu et al., "Boosting Privately: Privacy-Preserving Federated Extreme Boosting for Mobile Crowdsensing", arXiv:1907.10218v1, Jul. 24, 2019, pp. 1-10.

Bonawitz et al., "Practical Secure Aggregation for Federated Learning on User-Held Data", 30th Conference on Neural Information Processing Systems (NIPS 2016), Nov. 14, 2016, pp. 1-5.

Bonawitz et al., "Practical Secure Aggregation for Privacy-Preserving Machine Learning", Proceedings of the 2017 ACM SIGSAC Conference on Computer and Communications Security, CCS '17, Oct. 30-Nov. 3, 2017, pp. 1175-1191.

Chen et al., "XGBoost: A Scalable Tree Boosting System", Proceedings of the 22nd ACM SIGKDD International Conference on Knowledge Discovery and Data Mining, KDD '16, Aug. 13-17, 2016, pp. 785-794.

Cheng et al., "SecureBoost: A Lossless Federated Learning Framework", arXiv:1901.08755v1, Jan. 25, 2019, 12 pages.

Furukawa et al., "An Efficient Scheme for Proving a Shuffle", Advances in Cryptology, Crypto 2001, 21st Annual International Cryptology Conference, LNCS 2139, Aug. 19-23, 2001, pp. 368-387.

Gambs et al., "Privacy-Preserving Boosting", Data Mining and Knowledge Discovery, vol. 14, No. 1, Jan. 26, 2007, pp. 131-170.

Liu et al., "Boosting Privately: Federated Extreme Gradient Boosting for Mobile Crowdsensing", 2020 IEEE 40th International Conference on Distributed Computing Systems (ICDCS), Apr. 10, 2020, pp. 1-11.

* cited by examiner

Randomized 2D Vector S1 by Party A 302

$S_1 = \{a_1, b_1, c_1, d_1\}$

| | | | |
|---|---|---|---|
| | | | $d_1$ |
| | $a_1$ | | |
| $b_1$ | | $c_1$ | |

Randomized 2D Vector S2 by Party B 304

$S_2 = \{a_2, b_2, c_2, d_2\}$

| | | | |
|---|---|---|---|
| | | $c_2$ | |
| $d_2$ | $a_2$ | | $b_2$ |
| | | | |

Randomized 2D Vector S2 by Party C 306

$S_3 = \{a_3, b_3, c_3, d_3\}$

| | | | |
|---|---|---|---|
| | | $c_3$ | |
| | $a_3$ | | |
| $d_3$ | | | $b_3$ |

Aggregated 2D Vector Without Value Collision 310

| | | | | |
|---|---|---|---|---|
| | | | $d_1$ | |
| $d_2$ | | $c_3$ | | |
| | $a_1$ | $c_2$ | | |
| $a_3$ | | $a_2$ | | $b_2$ |
| $c_1$ | | | $b_3$ | |
| $b_1$ | $d_3$ | | | |

FIG. 3

METHOD AND SYSTEM FOR PRIVACY PRESERVING INFORMATION EXCHANGE BASED ON AGGREGATING MASKED VECTORS FROM LOCAL PARTIES

CROSS-REFERENCE TO RELATED APPLICATIONS

This application is a National stage of International Application No. PCT/IB2020/053635, filed 16 Apr. 2020, which claims priority to International Application No. PCT/IB2020/051159, filed on 12 Feb. 2020, which are hereby incorporated by reference.

TECHNICAL FIELD

Embodiments of the invention relate to the field of information sharing; and more specifically, to privacy preserving information exchange in a network of electronic devices.

BACKGROUND ART

In machine-learning and other applications, aggregation of information from multiple parties would make the learning more efficient and/or accurate. For example, some parties may have collected information from their own sources relating to a subject, e.g., from their clients, their own research, operation data, etc. and such parties may be referred to as "local parties." The information from all these parties in aggregation would be better to characterize the subject. It is desirable to have a central entity to aggregate the information, yet the central entity (referred to as an "aggregator") would learn which originating local party provides which information when the local parties transmit its information to the aggregator. The local party may prefer to preserve its privacy while sharing its local information on the object with other local parties and the aggregator.

BRIEF DESCRIPTION OF THE DRAWINGS

The invention may best be understood by referring to the following description and accompanying drawings that are used to illustrate embodiments of the invention. In the drawings:

FIG. 3 illustrates aggregation of 2D vectors without value collision per some embodiments.

SUMMARY

Figure 1:
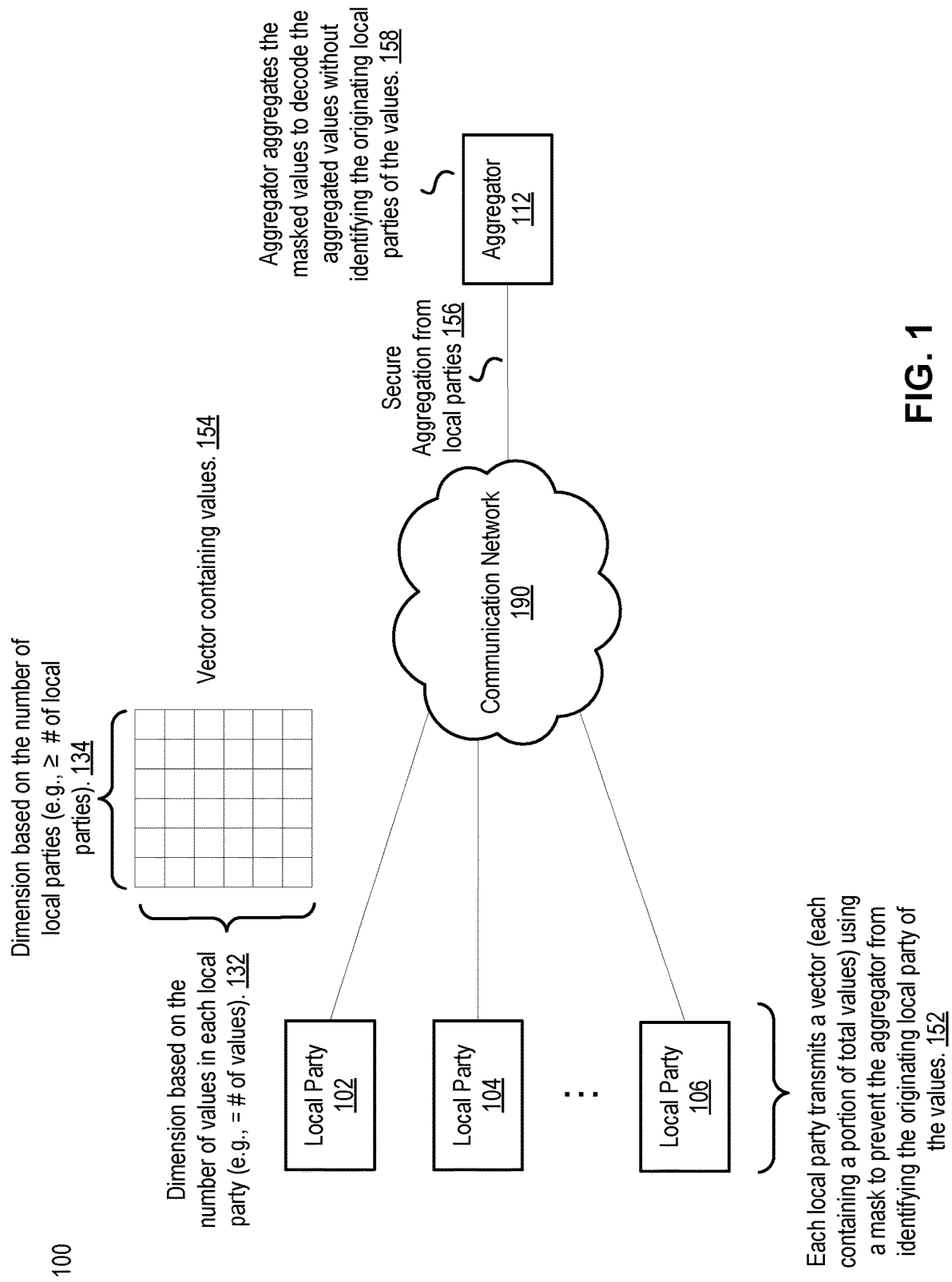
FIG. 1 illustrates a privacy preserving information exchange system per some embodiments.

Embodiments include methods implemented in an electronic device for privacy preserving information exchange. In one embodiment, a method is implemented in an electronic device to serve as a local party for privacy preserving information exchange between the local party and another electronic device to serve as an aggregator, where the aggregator exchanges information with a plurality of local parties including the local party. The method includes storing a plurality of values in a two-dimensional (2D) vector, where a first dimension of the 2D vector is based on the number of values, and where each position in the first dimension has one unique value within the plurality of values. The method further includes transmitting the 2D vector to the aggregator with masking for the aggregator to prevent the aggregator from decoding the 2D vector, where aggregating the masked 2D vector with masked 2D vectors from other local parties allows decoding of the aggregated 2D vector.

Embodiments include electronic devices for privacy preserving information exchange. In one embodiment, an electronic device is to serve as a local party for privacy preserving information exchange between the local party and another electronic device to serve as an aggregator, where the aggregator exchanges information with a plurality of local parties including the local party. The electronic device comprises a processor and non-transitory machine-readable storage medium having stored instructions, which when executed by the processor, are capable of causing the electronic device to perform storing a plurality of values in a two-dimensional (2D) vector, where a first dimension of the 2D vector is based on the number of values, and where each position in the first dimension has one unique value within the plurality of values. The instructions are capable of further causing the electronic device to perform transmitting the 2D vector to the aggregator with masking for the aggregator to prevent the aggregator from decoding the 2D vector, where aggregating the masked 2D vector with masked 2D vectors from other local parties allows decoding of the aggregated 2D vector.

Embodiments include non-transitory machine-readable storage media for privacy preserving information exchange. In one embodiment, a non-transitory machine-readable storage medium has stored instructions, which when executed by a processor of an electronic device, are capable of causing the electronic device to perform storing a plurality of values in a two-dimensional (2D) vector, where a first dimension of the 2D vector is based on the number of values, and where each position in the first dimension has one unique value within the plurality of values. The instructions are capable of further causing the electronic device to perform transmitting the 2D vector to the aggregator with masking for the aggregator to prevent the aggregator from decoding the 2D vector, where aggregating the masked 2D vector with masked 2D vectors from other local parties allows decoding of the aggregated 2D vector.

These embodiments provide a set of data structures for privacy preserving information exchange between local parties and an aggregator. The set of data structures with masking allows the local parties to transmit information to the aggregator without disclosing which local party contributes what data, yet the aggregator can decode the aggregated data from the local parties and make determinations based on the aggregated data. Such privacy preserving information exchange allows a local party to leverage data from other local parties and computing resources of the aggregator without sacrificing its privacy and has broad applications such as machine learning and artificial intelligence.

DETAILED DESCRIPTION

The following description describes methods and apparatus for privacy preserving information exchange in a network of electronic devices. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

Privacy Preserving Information Exchange Network

FIG. 1 illustrates a privacy preserving information exchange system per some embodiments. The system (also referred to as a network) 100 includes a plurality of local parties 102-106 and an aggregator 112, each local party and the aggregator being implemented in an electronic device (defined herein below). The local parties and the aggregator communicate through a communication network 190 (the communication network is discussed in more detail herein below).

At reference 152, each local party transmits a vector to the aggregator 112 using a mask to prevent the aggregator from identifying the original local party of the values. Each vector includes a portion of total values to be aggregated at the aggregator 112. In one embodiment, the vector is two-dimensional (2D) as shown at reference 154. In one embodiment, the 2D vector includes a first dimension 132 based on the number of values at the local party (also referred to as "local values") and a second dimension 134 based on the number of local parties.

To simplify explanation, the first dimension is referred to as the row of the 2D vector while the second dimension is referred to as the column of the 2D vector. Obviously, embodiments may include the reversed row and column designations. Additionally, the values may be transmitted in higher-dimensioned vectors (e.g., 3D or higher) as long as the values are included in 2D vectors within.

In one embodiment, the number of rows is equal to the number of local values to be aggregated and the number of columns is no less than the number of the local parties. In this way, each local value may take a row, and select one column of the row. In one embodiment, a row of the 2D vector may be selected randomly for a local value and a column within the row also randomly for the local value. In alternative embodiments, either the row or the column is selected using another selection policy. For example, the row may be selected based on the value—the lowest value takes row 1, the second lowest value takes row 2, and so on (or the reverse), and the column may be selected so that the local values from the first local party (assuming each local party is indexed to a number, and ordered to based on the index) takes the first column, the ones from the second local party takes the second, and so on.

In some embodiments, the 2D vector for each local party has the same size, and each local party has the same number of local values to be aggregated. Alternatively, the 2D vectors from local parties may have different sizes, depending on the number of local values and the way the column size is determined.

Note that when the size of the rows is large and the row is selected randomly for a value, the chance of two local parties selecting the same row and the same column (referred to as value collision) is reduced, thus a larger number of rows of the 2D vector reduces the chance of value collision. When values from the local parties are aggregated at the aggregator, value collision makes the value aggregation ambiguous thus the aggregator may ask the local parties to retransmit the collided values. Because of that, a large number of rows may be selected for the 2D vector to reduce the retransmission. For example, in some embodiments, the size of the rows is no less than a multiple of the number of local values.

In some embodiments, when the number of local parties is large, the local parties may be separated into subgroups, each including a subset of the local parties. In that case, the size of the 2D vectors is based on the size of the subset of the local parties and the values to be aggregated in the subset of the local parties. For example, the number of rows may be equal to the number of local values of a subgroup multiplied by the number of subgroups to be aggregated and the number of columns is no less than the number of the local parties in the subgroup.

In some embodiments (e.g., when the number of local parties is large), the number of columns may be fixed. For example, we have n parties who want to share m values, rather than sharing a 2D matrix of m rows and $\geq n$ (e.g., the order $n^2$) columns, it may be better to have a 2D array of $m \times n/s$ rows and $\geq s$ columns (e.g., the order $s^2$) where s is the number of local parties that share any given row. s must be an integer>1, the higher it is the more local parties must exchange information out of protocol with the aggregator to break secrecy, but also the transmission becomes more expensive. Each local party contributes to m of those $m \times n/s$ rows and must know who else contributes to those rows to use only the masks they share with them rather than all the masks. So, each party contributes a m row array, then the aggregator maps them to a $m \times n/s$ row array and add them to each other. The number of columns can then remain stable as n grow which makes that the method still work with large number of parties.

In some embodiments, the number of rows can be based on both the number of values and the number of local parties while the number of columns can be independent of both and be a fixed number. In addition, it is possible to have the local parties send only some of the rows (though they need to know who else will be sending these rows to apply the appropriate mask) which reduces the amount of communication needed.

In some embodiments, the local parties may break up into subgroups, and assign different sections of the 2D array to different subgroups. In this way, the size of the second dimension can be controlled at the cost of extending the first dimension.

For example, if an embodiment were to have 20 local parties and 50 split point candidate values, and if the number of columns is based on the number of local parties, the size of the 2D vector might be 50×n, where n≥50. If, for example, n=100, the size of the 2D vector might be 50×100=5,000. In another embodiment, the number of columns might be fixed. For example, if an embodiment were to have 20 local parties and 50 desired split point candidate values, the group of 20 local parties might, for example, be split into 4 subgroups of 5 local parties each. Each row may have a fixed number of columns. For example, each row may have 10 (>5, the number of local parties in a subgroup) columns. Each of the exemplary 4 subgroups may have 50 different rows, each of which could be for a split point candidate value, so that the size of the 2D vector would then be reduced to 4×50×10=2,000. Such reduction results in less bandwidth consumption between the local parties and the aggregator and less computation at the local parties/aggregator.

Each 2D vector from the local parties is masked to prevent the aggregator 112 from identifying the original local party of the values. The masked 2D vectors are transmitted to the aggregator 112 through the communication network 190. Since the masking prevents the aggregator 112 identifying the original local party of the values, the aggregation is the secure aggregation from the local parties as shown at reference 156. At reference 158, the aggregator aggregates the masked 2D vectors from other local parties, and the aggregation allows the decoding of the aggregated 2D vectors. That is, while each mask prevents the aggregator 112 from identifying the original local party of the values, the aggregation of the masked vectors allows the aggregator to obtain the aggregated values without such identification. In this way, the aggregator obtains the values from the local parties (in aggregation only without knowing each party's contribution) and the local parties preserve their privacy, thus privacy preserving information exchange between the local parties and the aggregator is achieved.

Masking Vectors and Demasking the Aggregated Vectors

In the privacy preserving information exchange, values from a local party are masked from the aggregator so that the aggregator can't decode the values themselves, yet the masking allows the aggregation of the values from multiple local parties to be decoded. A number of ways may achieve such masking and demasking. For example, a privacy-preserving machine learning mechanism is disclosed in "Practical Secure Aggregation for Privacy-Preserving Machine Learning," by Bonawitz et al. (hereinafter "Bonawitz") and published in 2017, which is hereby incorporated by reference.

To briefly explain, the privacy preserving information exchange uses masking at local parties and demasking at the aggregator through aggregating the masked local data. Each local party knows its own set of cryptographic keys to mask (referred to as a mask) and no other local parties nor the aggregator knows the set of cryptographic keys so that once a value is masked using the set of cryptographic keys (e.g., through encryption using the set of cryptographic keys), the other local parties and the aggregator can't decode the value. Yet the masks are designed so that the aggregation of the masks cancels out the masks, so that the aggregation of the masked values returns the aggregation of the values prior to the masking.

Figure 2:
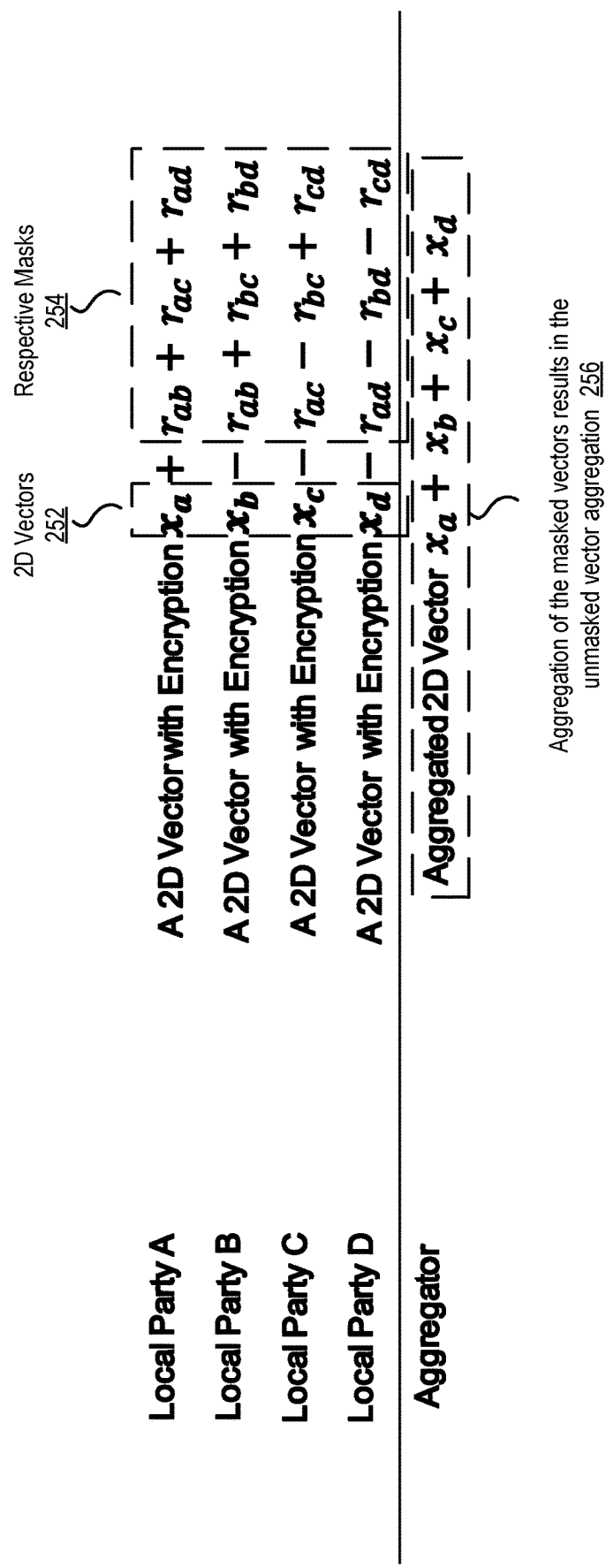
FIG. 2 illustrates the demasking through 2D vector aggregation per some embodiments.

Such masking and demasking may be applied to the aggregation of the 2D vectors from local parties. FIG. 2 illustrates the demasking through 2D vector aggregation per some embodiments. Each local party sends a masked 2D vector, which is shown as two components, a vector itself ($x_a$ to $x_d$) as shown at reference 252 and its respective mask as shown at reference 254. By applying the masks, no one (neither the aggregator nor the other local parties) but the sending local party knows the values within the vector it sent. Yet the aggregation of the masked vectors cancels out the impact of the individual masks, and the aggregation of the masked vectors at the aggregator results in the unmasked vector aggregation as shown at reference 256. Note that while the encryption is shown as simple addition of masks, more sophisticated encryption may be used including using different sets of symmetric and asymmetric keys.

Value Collison and Resolution

FIG. 3 illustrates aggregation of 2D vectors without value collision per some embodiments. As explained herein above, local parties may store values randomly in the 2D vectors. The 2D vectors $S_1$, $S_2$, and $S_3$ at parties A to C have the same dimension 5×4 as shown at references 302 to 306, where the number of columns (5) is larger than the number of local parties (3) and the number of rows (4) is equal to the number of local values. Each value takes a row (i.e., each row has one unique value) and the value takes a column within the row randomly. The randomization of the column positions of local values may be generated through a random number generator, a quasi-random number generator, or a pseudo-random number generator.

In this example, the 2D vectors from parties A to C are individually masked and then aggregated at an aggregator. As discussed herein above, the aggregation of the masked vectors cancels out the impact of the individual masks, and the aggregation results in the aggregated 2D vector, which has no value collision as shown at reference 310.

Figure 4A:
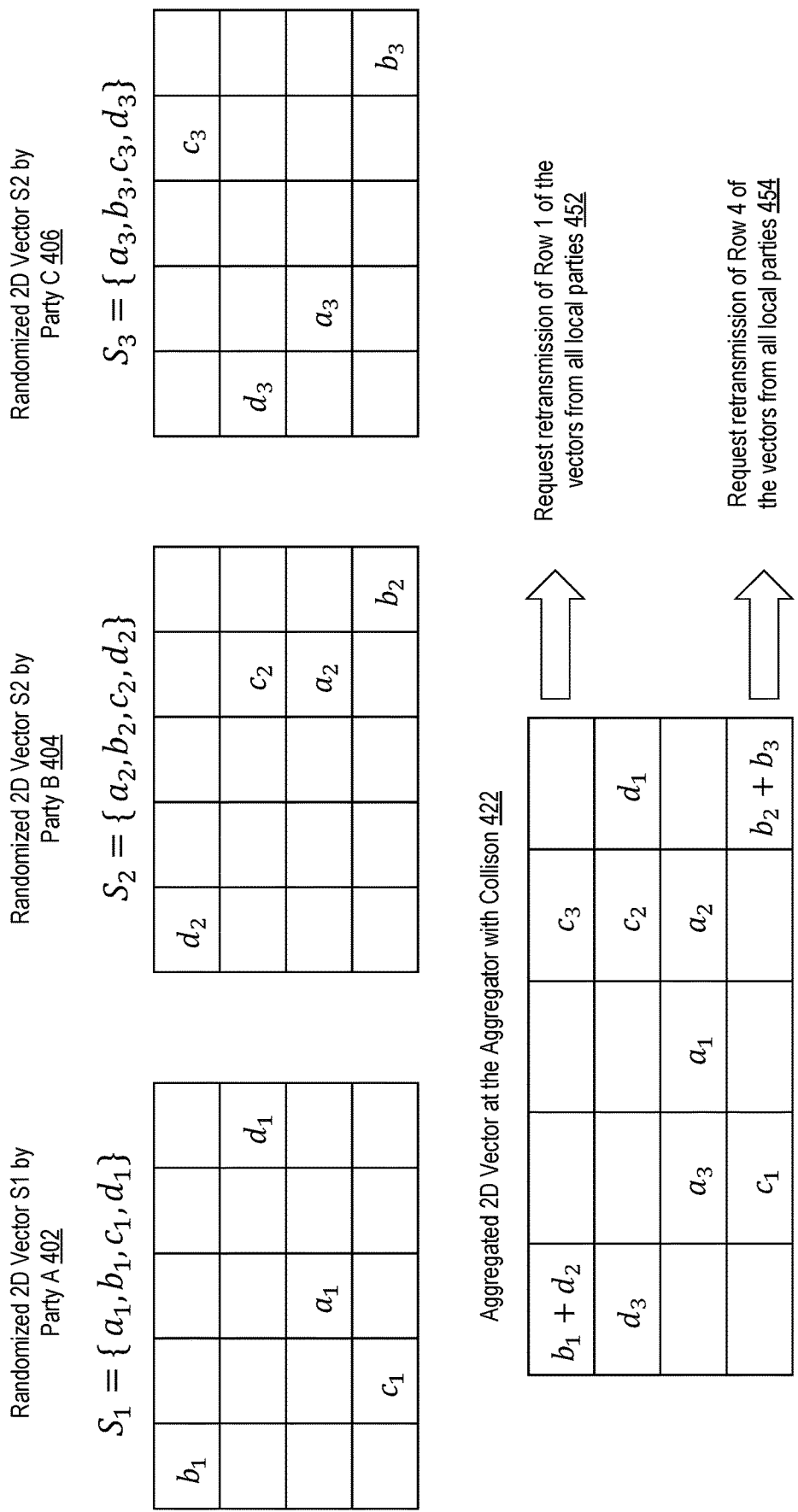
FIG. 4A illustrates aggregation of 2D vectors with value collision per some embodiments.

FIG. 4A illustrates aggregation of 2D vectors with value collision per some embodiments. The 2D vectors $S_1$, $S_2$, and $S_3$ at parties A to C have the same dimension 5×4 and same values as shown at references 402 to 406, but the difference is that randomization of column selection results in some values stored at columns different from that at references 302 to 306. In this example, the values $d_2$ in $S_2$ and $b_2$ in $S_3$ are moved to new column locations as shown at references 404 and 406.

Because the aggregator obtains the aggregation of the values of the aggregated 2D vector without knowing which value comes from which local party, the aggregator can't determine value collision based on the row location of each incoming 2D vector. Instead, the aggregator may detect the value collision in the aggregated 2D vector by counting the number of non-zero values in each row. Since the system has three local parties, when each local party has a unique value in a row in the aggregated 2D vector, each row shall have three non-zero values. In this case, each of the rows 2 and 3 of the aggregated 2D vector has three non-zero values, thus the aggregator determines that rows 2 and 3 of the aggregated 2D vector have no valid collision. In contrast, each of the rows 1 and 4 of the aggregated 2D vector has only two non-zero values, thus the aggregator determines that these rows have value collisions. The aggregator then requests retransmission of rows 1 and 4 of the 2D vectors from all local parties at references 452 and 454, respectively (e.g., including the row ID of the rows to be retransmitted in a request to the local parties). Again, since the aggregator does not know which value comes from which local party, it can't determine the local parties causing the value collisions, thus it requests retransmission of the collided rows from all local parties.

Figure 4B:
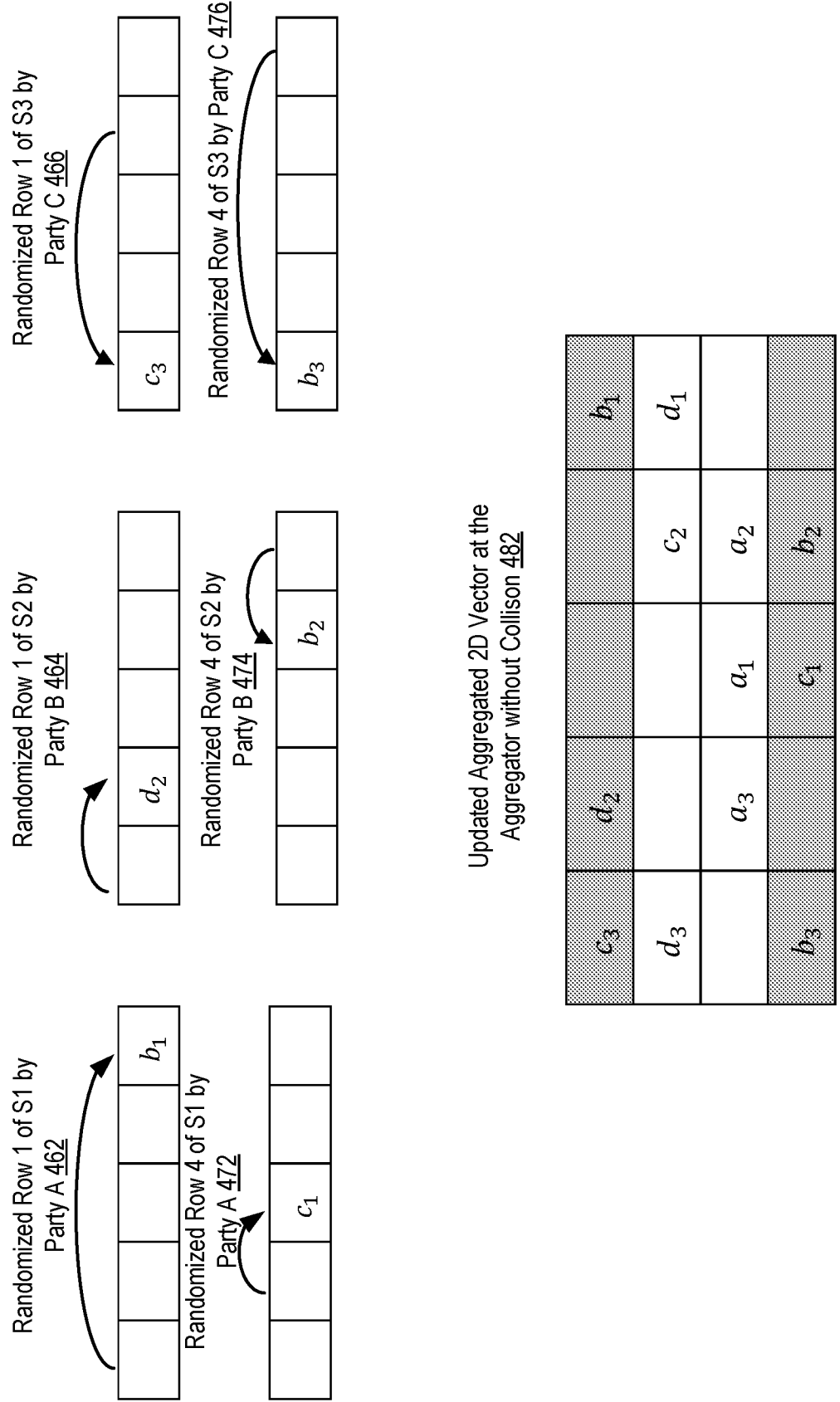
FIG. 4B illustrates retransmission of rows with value collision within the 2D vectors resulting in resolving the value collision per some embodiments.

FIG. 4B illustrates retransmission of rows with value collision within the 2D vectors resulting in resolving the value collision per some embodiments. Once a local party is notified to retransmit the rows with value collisions, it randomizes the column positions for the values to be retransmitted. In this example, the randomization at each party results in the column position changes for each value of rows 1 and 4 as shown at references 462 to 476. The updated rows are then transmitted from all the local parties to the aggregator, and results in the updated 2D vector that has no value collision as shown at reference 482.

While FIG. 4B shows that one set of retransmission resolves value collisions for all values, sometimes multiple iterations may be necessary to resolve the value collisions for all values. In that case, the aggregator would repeat the detection of value collision in the aggregated 2D vector after a retransmission by counting the number of non-zero values in each row and requests the local parties to retransmit the collided row(s). The local parties will perform the retransmission based on the new requests and masking the retransmitted values. The process continues until all value collisions within the aggregated 2D vector at the aggregator is resolved.

Note that each retransmitted masked vector is shown as a one-dimensional (1D) vector in the FIG. 4B embodiment. In some embodiments, the multiple retransmitted values from a local party may form a 2D vector. For example, instead of sending two 5×1 1D vectors at references 462 and 472, the party A may send one 5×2 2D vector storing the same values.

In some embodiments, instead of the aggregator requiring all the local parties to retransmit the rows with collided values until no value collision is detected, the aggregator may reduce the number of retransmissions. Upon the detection of collided rows, the aggregator knows how many values have collided. For example, if there are m values detected in a row and there were supposed to be n, then there are between 1 and n−m collided values (that are incorrect), and between 2m−1 and m−1 valid values. Collided values can be the results of the collision of 2 or more values, that are then missing.

After more than one iteration (e.g., 2 iterations), the aggregator can identify some or all of those values if we assume that it is unlikely that any value is equal to the sum of a set of other values (which should be the case if the values are given with high precision).

Figure 4C:
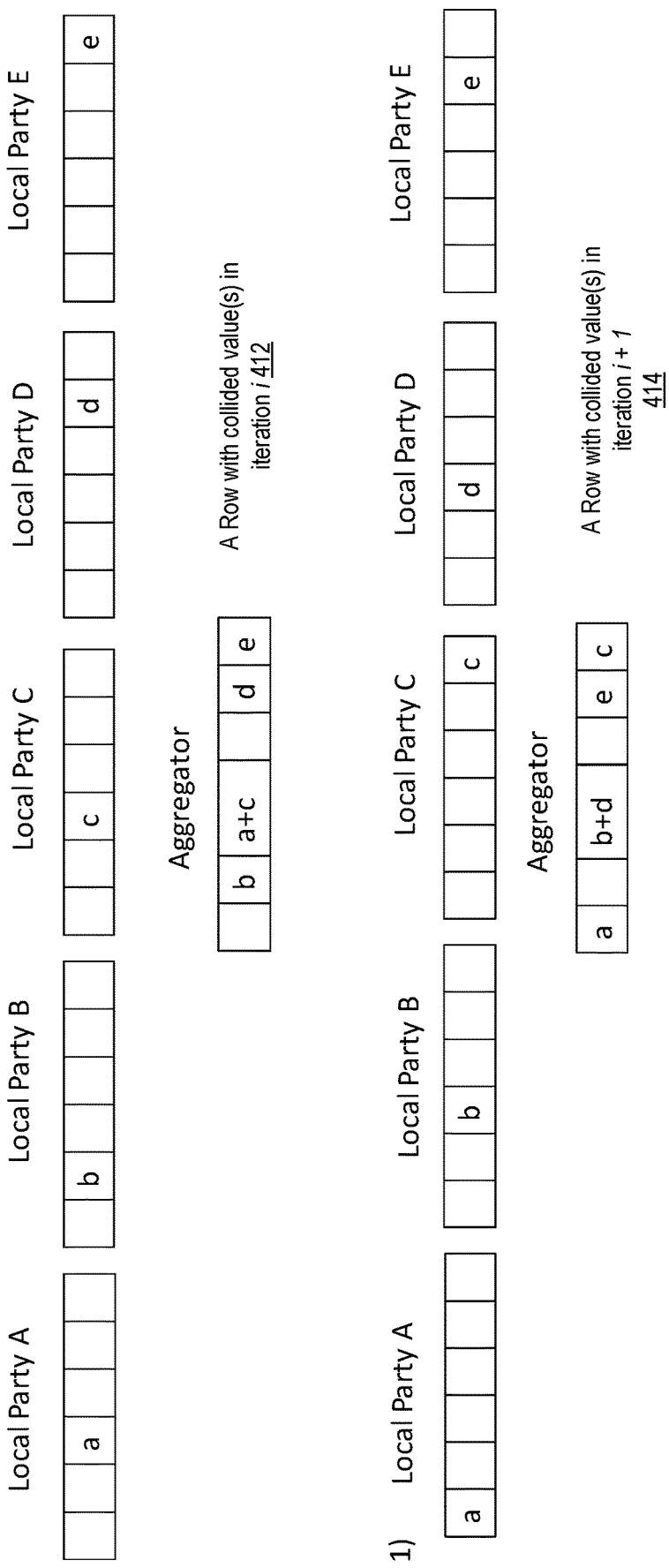
FIG. 4C illustrates value identification through after more than one iteration in a first embodiment.

FIG. 4C illustrates value identification through after more than one iteration in a first embodiment. As shown at reference 412, five parties each randomly transmit its value in a row in an iteration i (e.g., the first iteration), and that results in the aggregator receives aggregated values with one collided value and three valid values. The aggregator expects 5 values but receives 4 values as shown at reference 414. The aggregator requests the local parties to retransmit. The retransmission in the next iteration (iteration i+1) results again in 4 values as shown at reference 414. The aggregator determines that one value (b+d) is the sum of first and third value in the last iteration, so it may determine that values b and d are valid values, because of that, the rest values a, e, and c are valid as well, since 4 values are received.

Figure 4D:
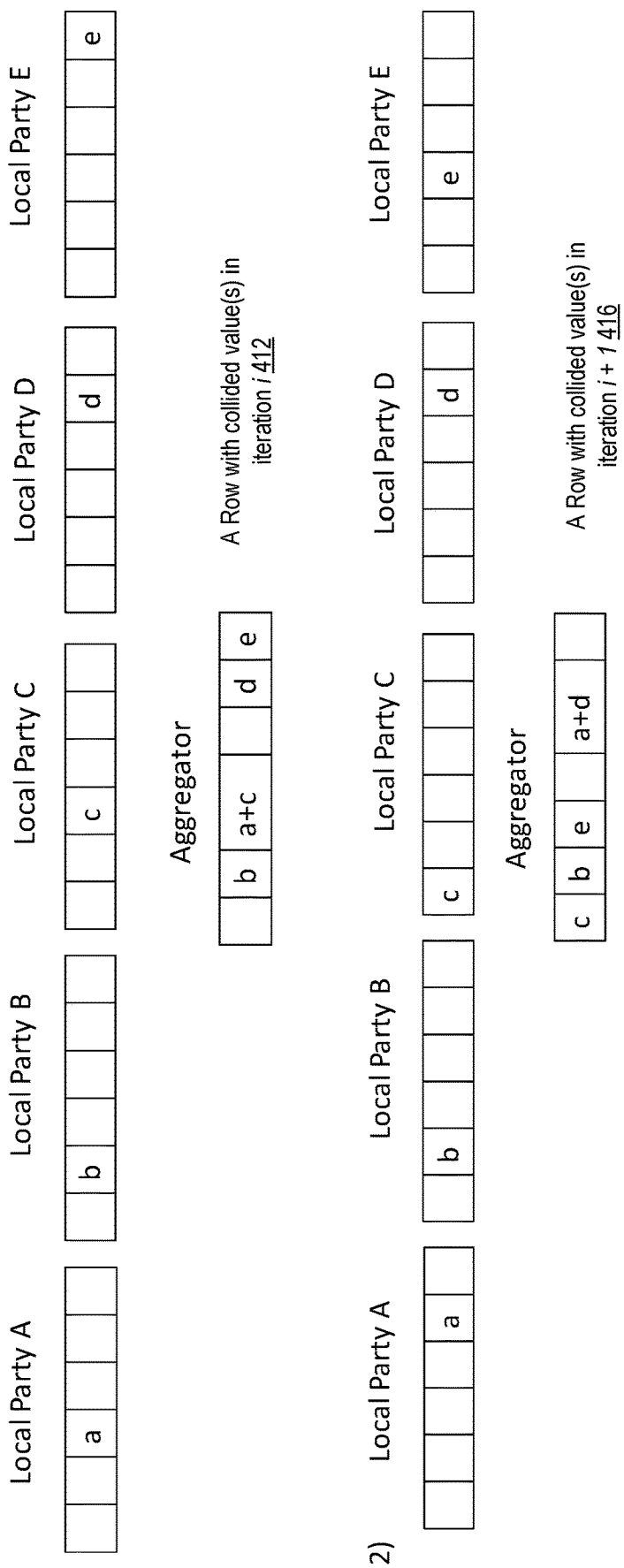
FIG. 4D illustrates value identification through after more than one iteration in a second embodiment.

FIG. 4D illustrates value identification through after more than one iteration in a second embodiment. The result of iteration i is the same as FIG. 4C and it is shown at reference 412. In the retransmission of the next iteration, 4 values are received as shown at reference 416 instead of the expected 5. In this iteration, the aggregator determines that values b and e were in the last iteration, Since 4 values are received, the iteration has only one collision, so that values b and e are valid, and the aggregator may request the respective sending local parties B and E not to retransmit, only the remaining local parties need to retransmit (with randomized positions again).

Figure 4E:
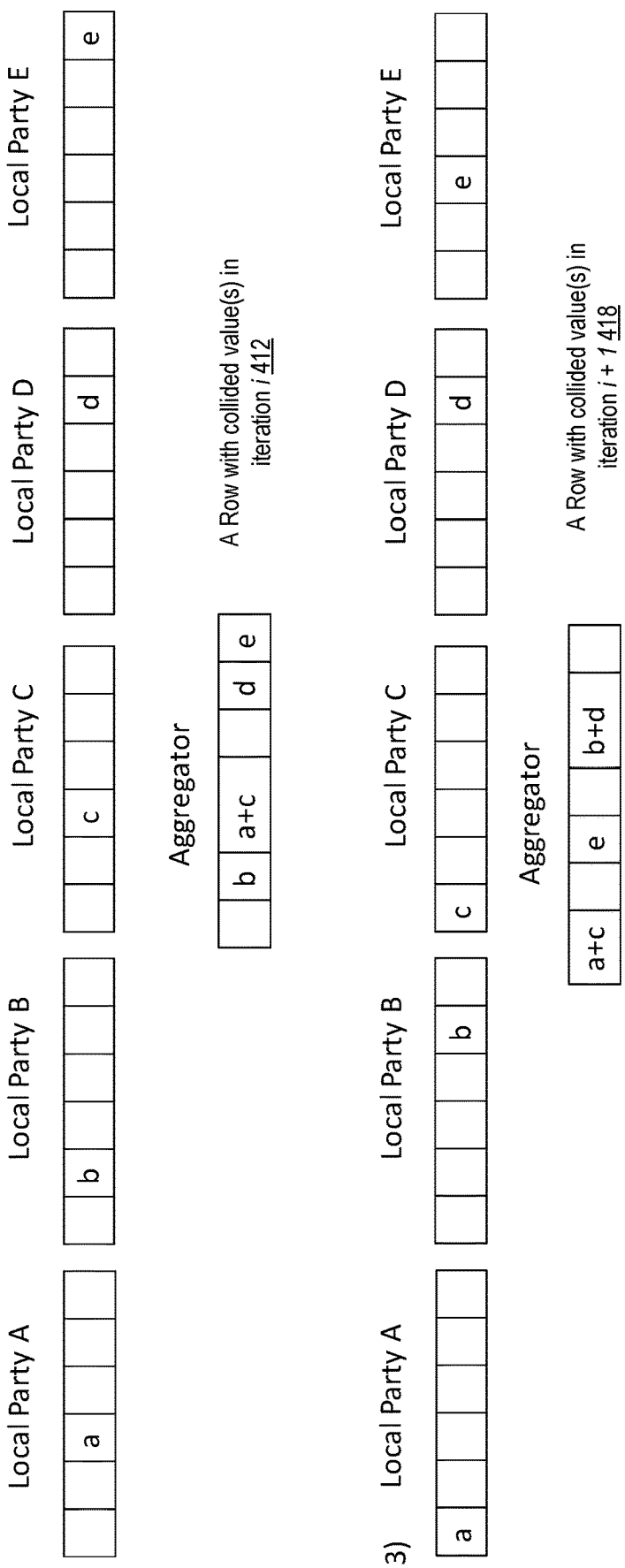
FIG. 4E illustrates value identification through after more than one iteration in a third embodiment.

FIG. 4E illustrates value identification through after more than one iteration in a third embodiment. The result of iteration i is the same as FIG. 4C and it is shown at reference 412. In the retransmission of the next iteration, 3 values are received at reference 418 instead of the expected 5. The aggregator determines that values e and a+c were in the last iteration and value (b+d) is the sum of two values in the previous iteration. Thus, the aggregator determines that values b and d are valid values, and no retransmission for them is necessary, and the aggregator may notify the respective local parties indicating so.

In examples of FIGS. 4D and 4E, even though the aggregator does not completely eliminate more iterations of local party retransmission, by determining which party (or parties) no longer needs to retransmit, less parties will perform the retransmission in future iterations thus reduce the bandwidth consumption between the local parties and the aggregator and computation at the local parties/aggregator.

Figure 4F:
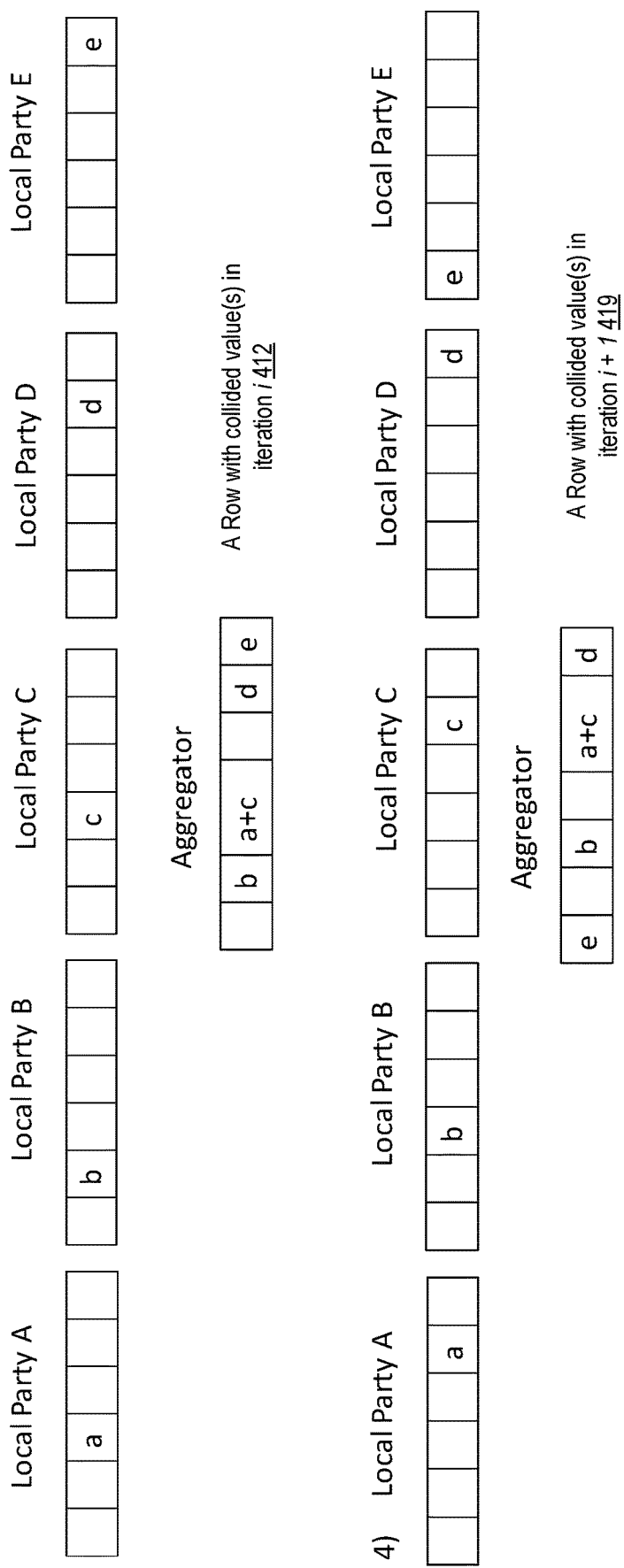
FIG. 4F illustrates value identification through after more than one iteration in a fourth embodiment.

FIG. 4F illustrates value identification through after more than one iteration in a fourth embodiment. The result of iteration i is the same as FIG. 4C and it is shown at reference 412. In the retransmission of the next iteration, 4 values are received instead of the expected 5. In this iteration, all the values at reference 419 are previously seen, the aggregator thus determines that the same collision occurred, and can't determine a value from the iteration, and the aggregator requires all the local parties to retransmit.

Using the values aggregated from all the local parties, the aggregator may obtain values from all local parties without learning from which local parties the values are sourced from. The aggregator may have superior computing resources compared to that of individual local parties and may make better/faster decisions using all the data from all the local parties. Thus, each local party may leverage the data from other local parties and the computing resources of the aggregator without compromising its privacy, and such advantages are useful in many applications. For example, the privacy preserving information exchange may be used in machine learning and artificial intelligence, including a networking system to combine a list of objects (e.g., names/identifiers, values/variables) without disclosing who contributed what, or a messaging system to aggregate anonymous messages. For example, computers of an organization can send such arrays at a pre-determined frequency. It's usually a mask on an empty array, but when someone has an anonymous message to send, it will be in a random location in the array.

Exemplary Application: Machine Learning

One application to use the privacy preserving information exchange is in machine learning, particularly training of a machine learning model, such as Gradient Boosting. XGBoost is an example of a Gradient Boosting technique that has gained traction. For example, XGBoost is disclosed in "XGBoost: A Scalable Tree Boosting System," by Chen et al. (hereinafter "Chen") and published in 2016, which is hereby incorporated by reference.

The basic idea of gradient boosted trees is to generate an ensemble of decision trees that in aggregate comprise a model for regression or classification problems. The predictions of each tree are then added together, and the sum is the prediction for the model. The performance of the model is measured by a given loss function. The loss function is a measure of the predicted values of the data, and the actual values of the data. Additionally, a regularization function that is a function of the number of leaf nodes in the ensemble as well as the weights of the leaf nodes in the ensemble can be used. In this case, the model is trained using a regularized objective, which is the sum of the loss function and the regularization function.

In XGBoost, training the model is done in an additive manner, one tree at a time. After t−1 trees have been trained, the algorithm trains tree t according to the following objective:

$$\tilde{\mathcal{L}}^{(t)} = \sum_{i=1}^{n} \left[ g_i f_t(x_i) + \frac{1}{2} h_i f_t^2(x_i) \right] + \Omega(f_t) \quad (1)$$

In Formula (1), $g_i$ is the first order derivative of the loss function with respect to the prediction, evaluated at the predicted value of data point i, $f_t(x_i)$ is the prediction of tree t on data point i, $h_i$ is the second order derivative of the loss function with respect to the prediction, evaluated at the predicted value of data point i, and $\Omega(f_t)$ is the value of a regularization function applied to tree t. Tree t is generated in a greedy manner, where for each feature, the training model evaluates a number of split point value candidates, and the loss reduction at each split point value candidate is given by:

$$\mathcal{L}_{split} = \frac{1}{2} \left[ \frac{\left(\sum_{i \in I_L} g_i\right)^2}{\sum_{i \in I_L} h_i + \lambda} + \frac{\left(\sum_{i \in I_R} g_i\right)^2}{\sum_{i \in I_R} h_i + \lambda} - \frac{\left(\sum_{i \in I} g_i\right)^2}{\sum_{i \in I} h_i + \lambda} \right] - \gamma \quad (2)$$

In formula (2), $I_L$ is the set of all data points to the left of the split point value candidate, $I_R$ is the set of all data points to the right of the split point value candidate, and $\lambda$ and $\gamma$ are parameters of the regularization function.

An example of the regularization function applied to tree t is the following:

$$\Omega(f) = \gamma T + \frac{1}{2} \lambda \|w\|^2 \quad (3)$$

In formula (3), T is the number of leaf nodes in the tree and $\|w\|^2$ is the sum of the squares of the weights of the leaf nodes.

Testing every single split point value candidate for every feature of a tree can get to be computationally infeasible for datasets of sufficiently large size. Therefore, the XGBoost algorithm allows for searching over a subset of split point value candidates for each feature. This subset of split point value candidates is described by a data structure known as a weighted quantile sketch, which comprises a certain, controllable number of points k, and approximately describes a k-quantile split distribution of the data, where each point i has weight $W_i$, which could be determined by the second derivative order of the loss function for point i, determined at the current prediction for point i.

A weighted quantile sketch Q includes the following components: (1) S=set of x values in the sketch; (2) w=weights for each x value; (3) r⁻(y)=rank minus function, essentially sum of weights for values<y; and (4) r⁺(y)=rank plus function, essentially sum of weights for values≤y.

Rank functions can be estimated for values not in the sketch by interpolating from rank and weight values for points immediately around the desired value, i.e., if $x_i < y < x_{i+1}$, then:

r⁻(y)=r⁻($x_i$)+w($x_i$)

r⁺(y)=r⁺($x_{i+1}$)−w($x_{i+1}$)

w(y)=0     (4)

Thus, for testing split point value candidates, the required data includes (i) split point value candidate, x; (ii) weights for split point value candidates, w; (iii) ranks determined by rank minus functions and rank plus functions; (iv) values based on the first order derivatives of the loss function (see e.g., Formula (1)); and (v) values based on the second order derivatives of the loss function (see e.g., Formula (1)). As shown in Formula (1), the values based on the first and second order derivatives may be a set of sums of derivatives of a loss function for the decision tree, where each sum aggregates values in between contiguous split point value candidates in some embodiments. In alternative embodiments, the values in (iv) and (v) may be derived using different formulas, applying the first order derivatives and/or the second order derivatives of a loss function.

Figure 5:
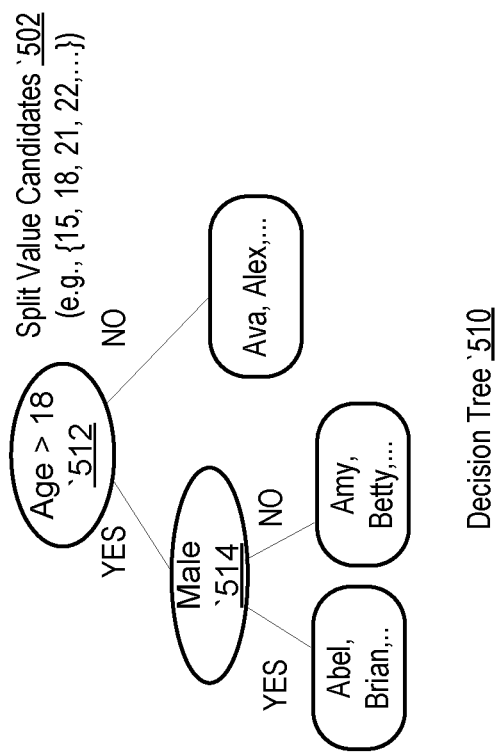
FIG. 5 illustrates a tree generation per some embodiments.

FIG. 5 illustrates a tree generation per some embodiments. The decision tree 510 includes a number of nodes, each node splitting on a feature. For example, node 512 maps to the feature of age and node 514 maps to the feature of gender. Each node mapping to a feature but a feature may be mapped to multiple nodes—e.g., the feature of age may be mapped to a node of age older than a certain age and another node of age younger than another age. For node 512, a number of split point value candidates 502 may be tested, including the split point value candidates 15, 18, 21, and 22. After the machine learning training, the single split point value 18 is selected for the feature at node 512. The machine learning training may use the privacy preserving information exchange. For example, the split value candidates may be transmitted from a number of local parties using masked 2D vectors to an aggregator, and the aggregator aggregate the masked 2D vectors to decode the aggregated 2D vector with aggregated values and extract the aggregated values in each position of the aggregated 2D vector without identifying local parties from which the values are originated. From the aggregated values, the aggregator may determine the split point value for the feature is 18.

Figure 6:
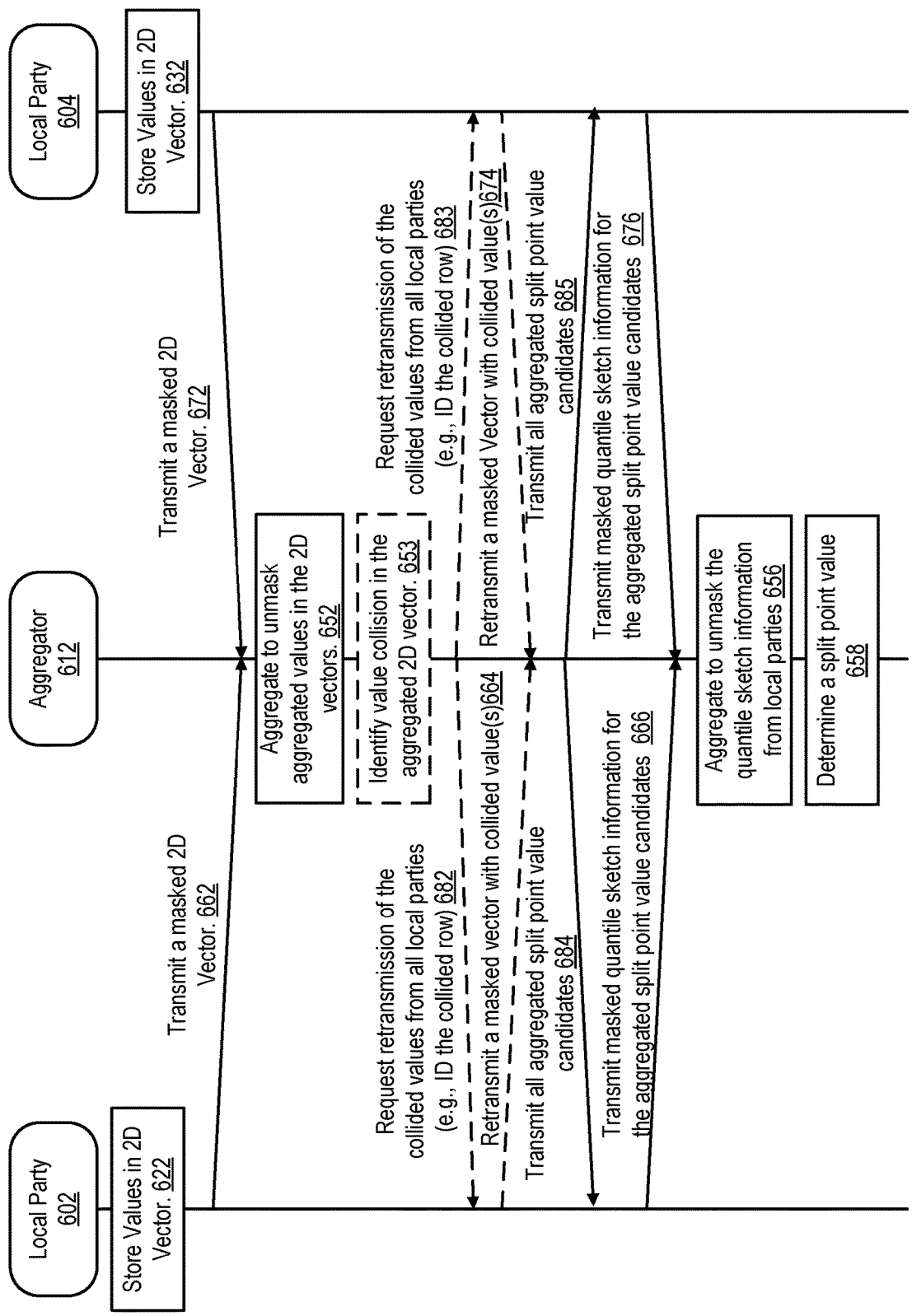
FIG. 6 illustrates the operations of determining a split point value based on split point value candidates from a number of local parties per some embodiments.

FIG. 6 illustrates the operations of determining a split point value based on split point value candidates from a number of local parties per some embodiments. As shown, a system includes local parties 602 and 604 and an aggregator 612. Obviously, the system may include a large number of local parties, and the illustration of two parties is for expediency of explanation.

At references 622 and 632, the local parties 602 and 604 store split point value candidates for a feature to their respective 2D vectors, each local party having one 2D vector and the determination of the dimension of the 2D vectors is explained herein above relating to FIG. 1.

At references 662 and 672, the local parties 602 and 604 transmit their respective masked 2D vectors to the aggregator 612. At reference 652, the aggregator 612 aggregates the masked 2D vectors to unmask the aggregated values without identifying local parties from which the values are originated. The masking and demasking, and the aggregation of the values are explained herein above relating to FIGS. 2 and 3.

Optionally, value collision is detected in the aggregated 2D vector, and the aggregator 612 identifies the value collision at reference 653. The aggregator 612 then requests the local parties 602 and 604 to retransmit the collided values at references 682 and 683 (e.g., by identifying the collided row(s)). The local parties 602 and 604 then each retransmit a masked vector with earlier collided value(s) at references 664 and 674. The locations of the retransmitted values may be randomized in the vectors. The value collision and retransmission are explained herein above relating to FIGS. 4A-B.

Once the aggregator 612 receives all the split point value candidates for the feature from all local parties, the aggregator 612 transmits all the aggregated split point value candidates to all local parties at references 684 and 685. Each local party then transmits quantile sketch information for all the split point value candidates it has to the aggregator 612 with masking as shown at references 666 and 676. Once the aggregator 612 receives the masked quantile sketch information, it aggregates them to unmask the quantile sketch information from local parties at reference 656. Then the aggregator 612 determines a split point value based on the quantile sketch information from the local parties at reference 658. In one embodiment, the determined split point value is a single value from all the split point value candidates.

About the quantile sketch information, as explained herein above relating to Formulae (1) to (4), other than the split point value candidates themselves (item (i) for testing split point value candidates explained above), the quantile sketch information additionally may include at least one of (1) weights and/or ranks (items (ii) and (iii) for testing split point value candidates explained above) and (2) values based on the first and/or second order derivatives of a loss function (items (iv) and (v) for testing split point value candidates explained above). While the quantile sketch information such as (1) and (2) are transmitted together from the local parties in some embodiments, in other embodiments, only (1) or (2) are needed for the determination of the split point value, in which case only (1) or (2) are transmitted to the aggregator 612.

Additionally, after receiving some quantile sketch information, the aggregator may decide to prune the whole split point value candidate list based on the quantile sketch information. In that case, the aggregator may send the reduced split point value candidate list after the pruning to the local parties, and the local parties will send additional quantile sketch information only for the remaining split point value candidates.

Using FIG. 3 as an example, the aggregator 612 will transmit the non-zero values in the aggregated 2D vector to all local parties (e.g., the operations at references 684 and 685), and the non-zero values are included in $S_{return}=\{a_1, b_1, c_1, d_1, a_2, b_2, c_2, d_2, a_3, b_3, c_3, d_3\}$. The local parties provide initial quantile sketch information about these split point candidate values with masking back to the aggregator, e.g., (1) weights and/or ranks for $S_{return}$ as discussed herein above. The aggregator obtains the initial quantile sketch information, and determines that a subset of $S_{return}$ is viable split point candidate values so it prunes the list to a smaller list, e.g., $S'_{return}=\{a_1, b_1, c_1, b_2, c_2, d_2, c_3, d_3\}$. The aggregator will transmit the smaller list to all local parties, and the local parties may provide additional quantile sketch information about these remaining split point candidate values with masking back to the aggregator, e.g., (2) values based on the first and/or second order derivatives of a loss function for $S'_{return}$ as discussed herein above. By partitioning the quantile sketch information into a first batch (i.e., the initial quantile sketch information) and a second batch (i.e., the additional quantile sketch information) so that the latter is for the pruned list of split point value candidates only, the system reduces (1) bandwidth consumption between the local parties and the aggregator and/or (2) computing resources of local parties and aggregator (e.g., the local parties do not need to compute the additional quantile sketch information for the split point value candidates that are pruned by the aggregator based on the first batch and the aggregator does not perform additional computation for these removed split point candidates). While in this embodiment the initial quantile sketch information is (1) the weights and/or ranks discussed herein above and the additional quantile sketch information is (2) the values based on the first and/or second order derivatives of a loss function discussed herein above, other embodiment may reverse the order so that the information in (2) is the initial quantile sketch information and the information in (1) is the additional quantile sketch information.

Through the operations relating to FIG. 6, the system preserves the privacy of the local parties while using the aggregated information from the local parties to generate a decision tree model, so that the machine learning can be performed successfully without compromising the privacy of the local parties.

SOME EMBODIMENTS

Figure 7:
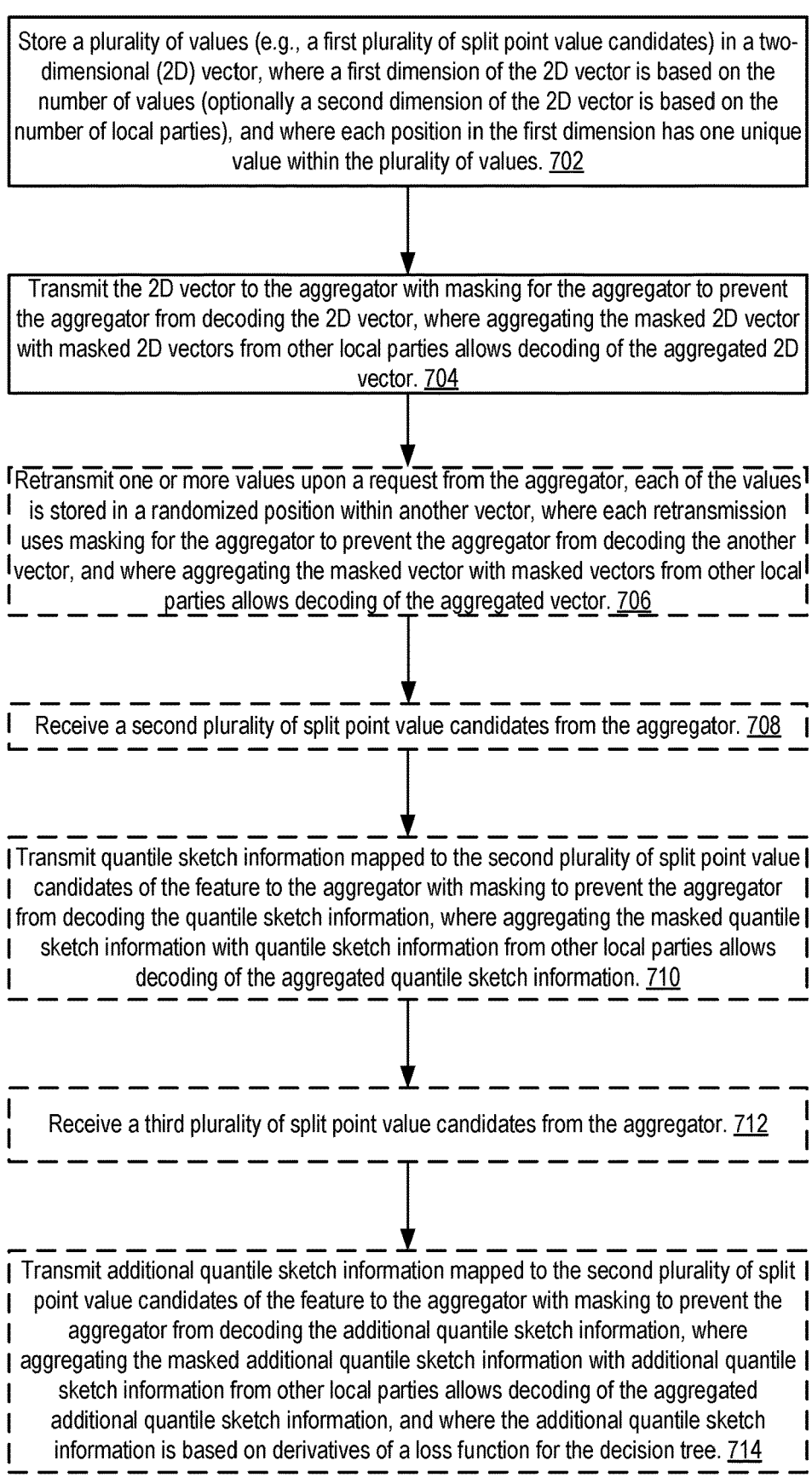
FIG. 7 is a flow diagram showing the operations of an electronic device serving as a local party for privacy preserving information exchange between the local party and another electronic device to serve as an aggregator per some embodiments.

FIG. 7 is a flow diagram showing the operations of an electronic device serving as a local party for privacy preserving information exchange between the local party and another electronic device to serve as an aggregator per some embodiments. The electronic device may be one of network devices 902 to 906 discussed herein below.

At reference 702, a plurality of values is stored in a two-dimensional (2D) vector, where a first dimension of the 2D vector is based on the number of values, and where each position in the first dimension has one unique value within the plurality of values. In some embodiment, and a second dimension of the 2D vector is based on the number of local parties. The determination of the dimension of the 2D vectors is explained herein above relating to FIG. 1. For example, the first dimension of the 2D vector is equal to the number of the first plurality of split point value candidates, and the second dimension of the 2D vector is no less than the number of local parties in some embodiments.

At reference 704, the 2D vector is transmitted to the aggregator with masking for the aggregator to prevent the aggregator from decoding the 2D vector, where aggregating the masked 2D vector with masked 2D vectors from other local parties allows decoding of the aggregated 2D vector. The masking and demasking, and the aggregation of the values are explained herein above relating to FIGS. 2 and 3.

In some embodiments, the exchanged information is decision tree information for decision tree learning. The aggregator is to generate a decision tree, where the plurality of values are a first plurality of split point value candidates for at least one feature of the decision tree, and where the aggregator is to determine a single split point value for one node of the decision tree based on the aggregated 2D vector. In some embodiments, the plurality of split point value candidates each map to a sketch of data for the feature at the local party.

Value collision may be detected in the aggregated 2D vector, in which case at reference 706, the local party retransmits one or more values upon a request from the aggregator, each of the values is stored in a randomized position within another vector, where each retransmission uses masking for the aggregator to prevent the aggregator from decoding the another vector, and where aggregating the masked vector with masked vectors from other local parties allows decoding of the aggregated vector. The valid collision and retransmission are discussed herein above relating to FIGS. 4A-B. Note that the other vector may be a 1D or 2D vector as discussed herein above relating to FIG. 4B.

Additionally, optionally at reference 708, a second plurality of split point value candidates is received from the aggregator, and at reference 710, the local party transmits quantile sketch information mapped to the second plurality of split point value candidates of the feature to the aggregator with masking to prevent the aggregator from decoding the quantile sketch information, where aggregating the masked quantile sketch information with quantile sketch information from other local parties allows decoding of the aggregated quantile sketch information. The second plurality of split point value candidates may be all the split point value candidates for a feature.

The transmitted quantile sketch information may include all the quantile sketch information about the second plurality of split point value candidates in some embodiments. In alternative embodiments, the transmitted quantile sketch information may include only the initial quantile sketch information discussed herein above relating to FIG. 6. In that case, the aggregator may perform pruning, and at reference 712, the local party receives a third plurality of split point value candidates from the aggregator. The third plurality of split point value candidates are a subset of the second plurality of split point value candidates in some embodiments.

Then at reference 714, the local party transmits additional quantile sketch information mapped to the third plurality of split point value candidates of the feature to the aggregator with masking to prevent the aggregator from decoding the additional quantile sketch information, and where aggregating the masked additional quantile sketch information with additional quantile sketch information from other local parties allows decoding of the aggregated additional quantile sketch information, and where the additional quantile sketch information is based on derivatives of a loss function for the decision tree. The operations of the transmission of the quantile sketch information (e.g., the initial and additional quantile sketch information) are discussed herein above relating to FIG. 6.

Figure 8A:
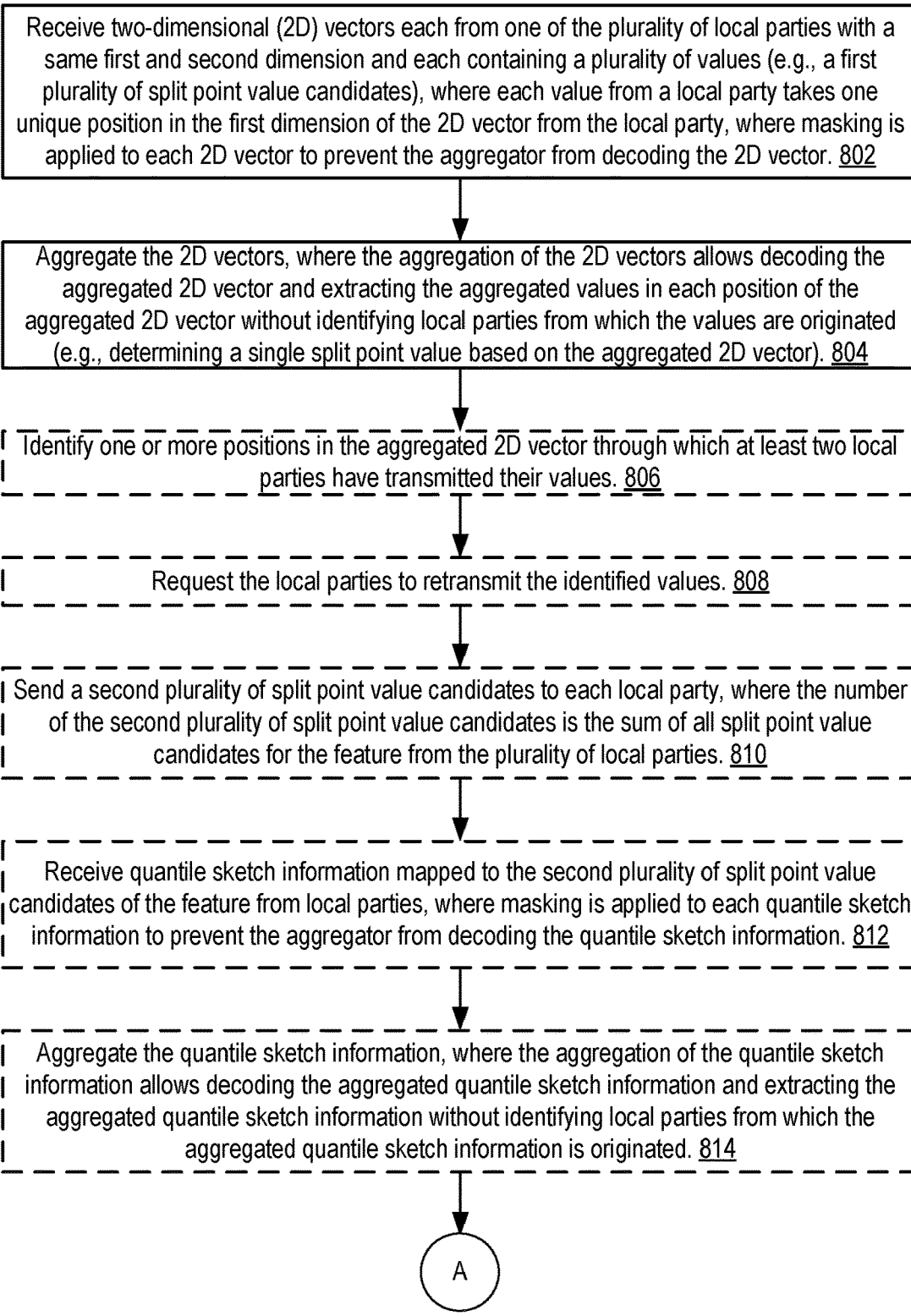
FIGS. 8A-B are flow diagrams showing the operations of an electronic device serving as an aggregator for privacy preserving information exchange between a plurality of electronic devices each serving as a local party per some embodiments.
Figure 8B:
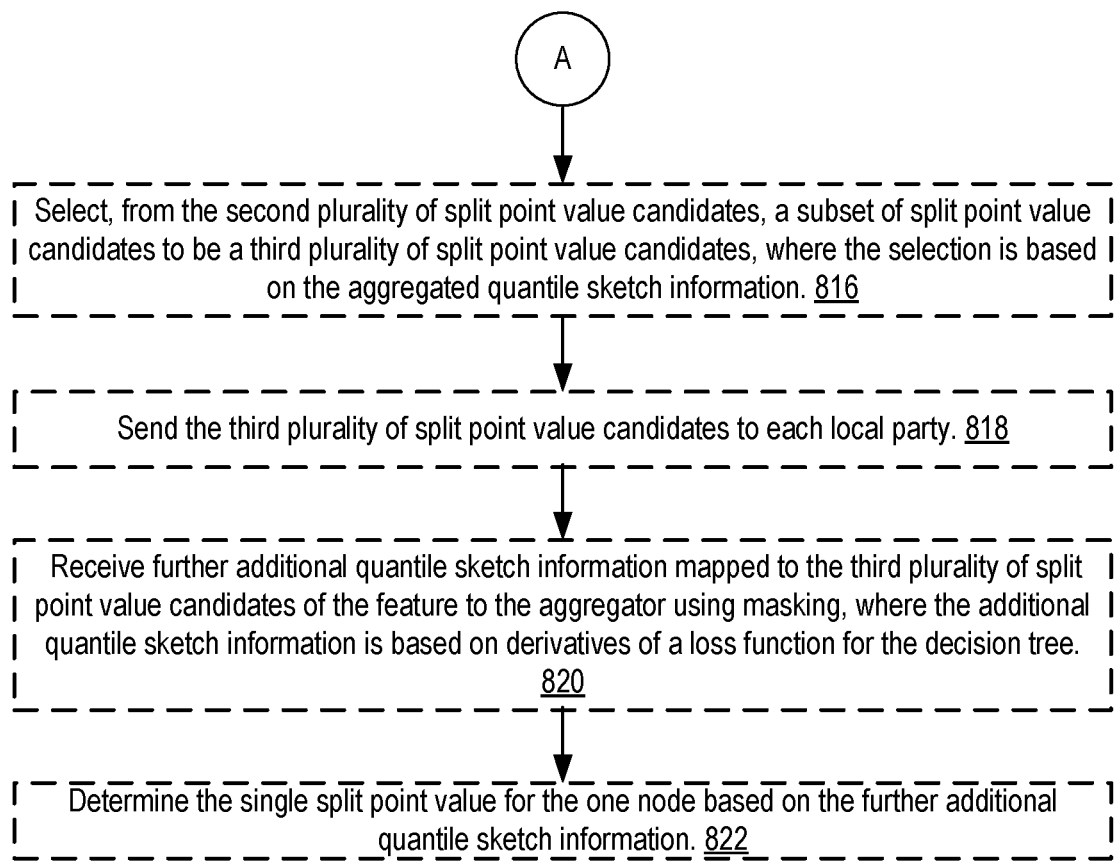

FIGS. 8A-B are flow diagrams showing the operations of an electronic device serving as an aggregator for privacy preserving information exchange between a plurality of electronic devices each serving as a local party per some embodiments. The electronic device may be one of network devices 902 to 906 discussed herein below.

At reference 802 of FIG. 8A, the aggregator receives a plurality of two-dimensional (2D) vectors each from one of the plurality of local parties with a same first and second dimension and each containing a plurality of values, where each value from a local party takes one unique position in the first dimension of the 2D vector from the local party, and where masking is applied to each 2D vector to prevent the aggregator from decoding the 2D vector. The dimension of the 2D vector is explained herein above relating to FIG. 1. For example, the first dimension of the 2D vector is equal to the number of the first plurality of split point value candidates, and the second dimension of the 2D vector is no less than the number of local parties in some embodiments.

At reference 804, the 2D vectors are aggregated, where the aggregation of the 2D vectors allows decoding the aggregated 2D vectors and extracting the aggregated values in each position of the aggregated 2D vector without identifying local parties from which the values are originated.

In some embodiments, the exchanged information is decision tree information for decision tree learning. The aggregator is to generate a decision tree, where the plurality of values are a first plurality of split point value candidates for at least one feature of the decision tree, and where the aggregator is to determine a single split point value for one node of the decision tree based on the aggregated 2D vector. In some embodiments, the plurality of split point value candidates each map to a sketch of data for the feature at the local party.

Value collision may be detected in the aggregated 2D vector and the flow goes to reference 806, where the aggregator identifies one or more positions in the aggregated 2D vector through which at least two local parties have transmitted their values. Then the aggregator requests at reference 808 the local parties to retransmit the identified values (e.g., using 1D or 2D vectors discussed herein above relating to FIG. 4B).

Optionally the flow goes to reference 810, where the aggregator sends a second plurality of split point value candidates to each local party, and where the number of the second plurality of split point value candidates is the sum of all split point value candidates for the feature from the plurality of local parties.

At reference 812, the aggregator receives quantile sketch information mapped to the second plurality of split point value candidates of the feature from local parties, where masking is applied to each quantile sketch information to prevent the aggregator from decoding the quantile sketch information. At reference 814, the quantile sketch information is aggregated, where the aggregation of the quantile sketch information allows decoding the aggregated quantile sketch information and extracting the aggregated quantile sketch information without identifying local parties from which the aggregated quantile sketch information is originated.

The transmitted quantile sketch information may include all the quantile sketch information about the second plurality of split point value candidates in some embodiments. In alternative embodiments, the transmitted quantile sketch information may include only the initial quantile sketch information discussed herein above relating to FIG. 6. In that case, the aggregator may perform pruning at reference 816 of FIG. 8B, where the aggregator selects, from the second plurality of split point value candidates, a subset of split point value candidates to be a third plurality of split point value candidates, where the selection is based on the aggregated quantile sketch information. Then the aggregator sends the third plurality of split point value candidates to each local party at reference 818.

Then at reference 820, the aggregator receives further additional quantile sketch information mapped to the third plurality of split point value candidates of the feature to the aggregator using masking, where the additional quantile sketch information is based on derivatives of a loss function for the decision tree. At reference 822, the aggregator determines the single split point value for the one node based on the further additional quantile sketch information.

Network Environments Under which Embodiments May Operate

Figure 9:
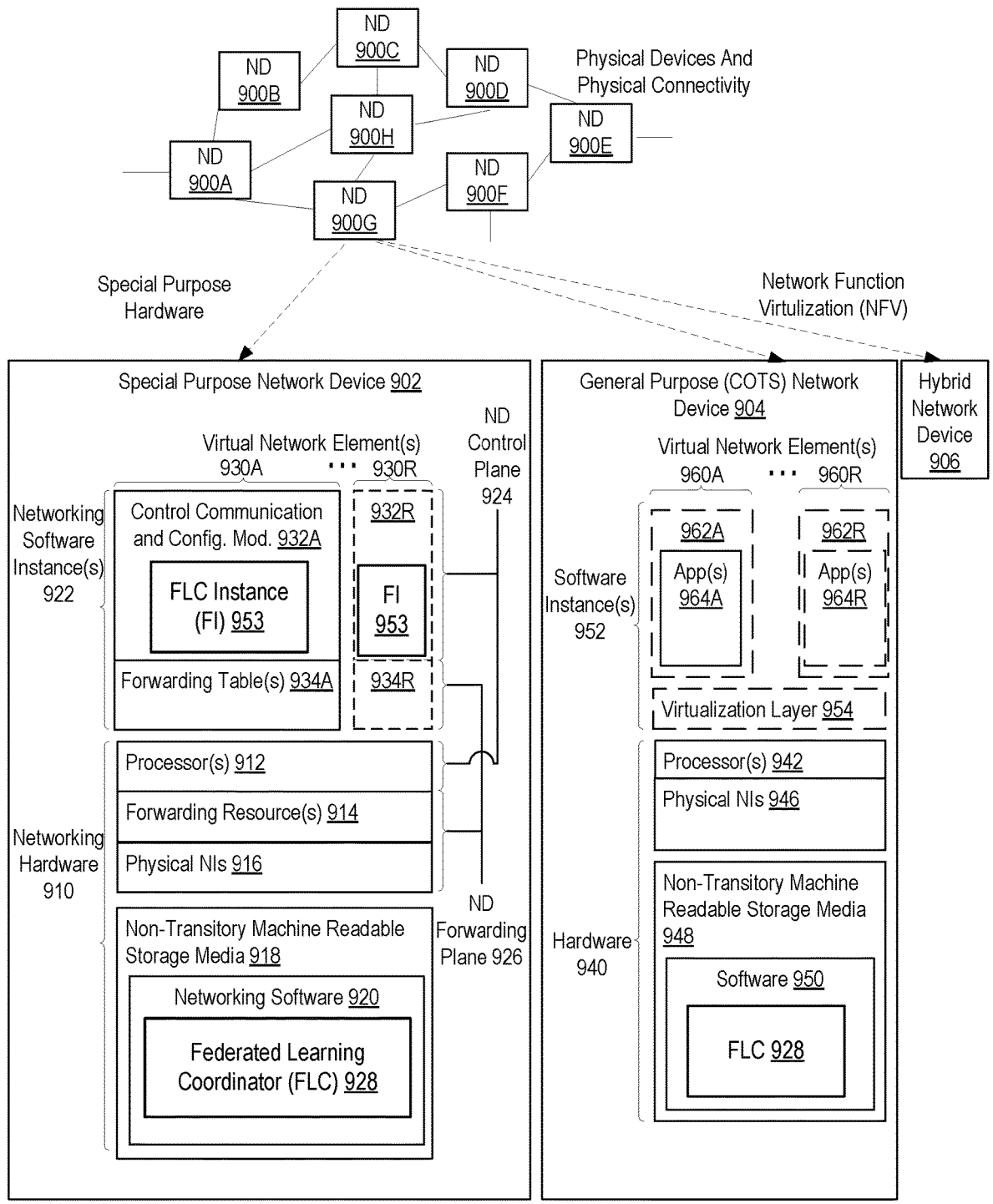
FIG. 9 illustrates connectivity between network devices (NDs) within an exemplary network, as well as three exemplary implementations of the NDs, according to some embodiments.

FIG. 9 illustrates connectivity between network devices (NDs) within an exemplary network, as well as three exemplary implementations of the NDs, according to some embodiments. FIG. 9 shows NDs 900A-H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs).

Two of the exemplary ND implementations in FIG. 9 are: 1) a special-purpose network device 902 that uses custom application-specific integrated-circuits (ASICs) and a special-purpose operating system (OS); and 2) a general purpose network device 904 that uses common off-the-shelf (COTS) processors and a standard OS.

The special-purpose network device 902 includes networking hardware 910 comprising a set of one or more processor(s) 912, forwarding resource(s) 914 (which typically include one or more ASICs and/or network processors), and physical network interfaces (NIs) 916 (through which network connections are made, such as those shown by the connectivity between NDs 900A-H), as well as non-transitory machine readable storage media 918 having stored therein networking software 920. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A). In one embodiment, the networking software 920 contains a federated learning coordinator 928. The federated learning coordinator 928 may perform operations described with reference to earlier figures. The federated learning coordinator 928 may generate one or more federated learning coordinator instance(s) 953, each for a virtual network element (e.g., a virtual switch). The federated learning coordinator 928 may be implemented in either a local party or an aggregator discussed herein above. When it is implemented in a local party, it performs local party operations (e.g., the ones relating to FIG. 7); and when it is implemented in an aggregator, it performs aggregator operations (e.g., the ones relating to FIGS. 8A-B).

The special-purpose network device 902 is often physically and/or logically considered to include: 1) an ND control plane 924 (sometimes referred to as a control plane) comprising the processor(s) 912 that execute(s) the control communication and configuration module(s) 932A-R; and 2) an ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the processor(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out to the appropriate ones of the physical NIs 916 based on the forwarding table(s) 934A-R.

The general-purpose network device 904 includes hardware 940 comprising a set of one or more processor(s) 942 (which are often COTS processors) and physical NIs 946, as well as non-transitory machine-readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization. For example, in one such alternative embodiment, the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers). Note that the networking software 950 includes the federated learning coordinator 928, whose operations are discussed herein. The federated learning coordinator 928 may be instantiated in the virtualization layer 954 in some embodiments.

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high-volume server hardware, physical switches, and physical storage, which could be located in data centers, NDs, and customer premise equipment (CPE). While embodiments are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-R and the physical NI(s) 946, as well as optionally between the instances 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9 is a hybrid network device 906, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 930A-R, VNEs 960A-R, and those in the hybrid network device 906) receives data on the physical NIs (e.g., 916, 946) and forwards that data out to the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of an ND), transport protocol (e.g., user datagram protocol (UDP), Transmission Control Protocol (TCP), and differentiated services code point (DSCP) values).

The NDs of FIG. 9 may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9 may also host one or more such servers (e.g., in the case of the general purpose network device 904, one or more of the software instances 962A-R may operate as servers; the same would be true for the hybrid network device 906; in the case of the special-purpose network device 902, one or more such servers could also be run on a virtualization layer executed by the processor(s) 912); in which case the servers are said to be co-located with the VNEs of that ND.

A virtual network is a logical abstraction of a physical network (such as that in FIG. 9) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on an NVE (e.g., a NE/VNE on an ND, a part of a NE/VNE on an ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus)). AAA can be provided through a client/server model, where the AAA client is implemented on an ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, an ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations, other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection-oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection-oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e., the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection-oriented packet switching, meaning that data is always delivered along the same network path, i.e., through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes; for example, aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS)) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Note that an electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical, or other forms of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, or a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radiofrequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to an NIC. One or more parts of an embodiment may be implemented using different combinations of software, firmware, and/or hardware.

A network node/device is an electronic device. Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Examples of network nodes also include NodeB, base station (BS), multi-standard radio (MSR) radio node (e.g., MSR BS, eNodeB, gNodeB. MeNB, SeNB), integrated access backhaul (IAB) node, network controller, radio network controller (RNC), base station controller (BSC), relay, donor node controlling relay, base transceiver station (BTS), Central Unit (e.g., in a gNB), Distributed Unit (e.g., in a gNB), Baseband Unit, Centralized Baseband, C-RAN, access point (AP), transmission points, transmission nodes, RRU, RRH, nodes in distributed antenna system (DAS), core network node (e.g., MSC, MME, etc.), O&M, OSS, SON, positioning node (e.g., E-SMLC), etc.

A communication network (e.g., the communication network 190) may comprise and/or interface with any type of communication, telecommunication, data, cellular, and/or radio network or other similar type of system. In some embodiments, the communication network may be configured to operate according to specific standards or other types of predefined rules or procedures. Thus, particular embodiments of the communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the Institute of Electrical and Electronics Engineers (IEEE) 802.11 standards; and/or any other appropriate wireless communication standard, such as the Worldwide Interoperability for Microwave Access (WiMax), Bluetooth, Z-Wave and/or ZigBee standards.

A communication network may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notations should not be taken to mean that these are the only options or optional operations, and/or that blocks with solid borders are not optional in certain embodiments.

In the description, embodiments, and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein, refers to any positive whole number of items including one item.

ALTERNATIVE EMBODIMENTS

While the invention has been described in terms of several embodiments, those skilled in the art will recognize that the invention is not limited to the embodiments described and can be practiced with modification and alteration within the spirit and scope of the appended claims. The description is, thus, to be regarded as illustrative instead of limiting.

What is claimed is:

1. A method implemented in an electronic device to serve as a local party for privacy preserving information exchange between the local party and another electronic device to serve as an aggregator, wherein the aggregator exchanges information with a plurality of local parties including the local party, wherein the exchanged information is decision tree information for decision tree learning, and wherein the aggregator is to generate a decision tree, the method comprising:

storing a plurality of values in a two-dimensional (2D) vector, wherein a first dimension of the 2D vector is based on how many values are in the plurality of values, and wherein each position in the first dimension has one unique value within the plurality of values, wherein each unique value within the plurality of values is in a randomly selected position in a second dimension, and wherein the plurality of values comprises a first plurality of split point value candidates for at least one feature of the decision tree;

transmitting the 2D vector to the aggregator with masking for the aggregator to prevent the aggregator from decoding the 2D vector to determine the plurality of values transmitted by the local party, wherein aggregating each position of the masked 2D vector with corresponding positions of masked 2D vectors from other local parties allows unmasking of the plurality of values in the 2D vector without identifying the local parties from which the values originated;

receiving a second plurality of split point value candidates from the aggregator; and transmitting quantile sketch information mapped to the second plurality of split point value candidates of the feature to the aggregator with masking to prevent the aggregator from decoding the quantile sketch information, wherein aggregating the masked quantile sketch information with quantile sketch information from other local parties allows decoding of the aggregated quantile sketch information.

2. The method of claim 1, wherein the aggregator is to determine a single split point value for one node of the decision tree based on the aggregated 2D vector.

3. The method of claim 1, wherein the first dimension of the 2D vector is equal to the number of the first plurality of split point value candidates, and wherein the second dimension of the 2D vector is no less than the number of local parties.

4. The method of claim 1, wherein the plurality of split point value candidates each map to a sketch of data for the feature at the local party.

5. The method of claim 1, further comprising:

receiving a third plurality of split point value candidates from the aggregator; and transmitting additional quantile sketch information mapped to the third plurality of split point value candidates of the feature to the aggregator with masking to prevent the aggregator from decoding the additional quantile sketch information, and wherein aggregating the masked additional quantile sketch information with additional quantile sketch information from other local parties allows decoding of the aggregated additional quantile sketch information, wherein the additional quantile sketch information is based on derivatives of a loss function for the decision tree.

6. The method of claim 5, wherein the third plurality of split point value candidates is a subset of the second plurality of split point value candidates.

7. The method of claim 1, further comprising:

retransmitting one or more values upon a request from the aggregator, each of the values is stored in a randomized position within another vector, wherein each retransmission uses masking for the aggregator to prevent the aggregator from decoding the another vector, and wherein aggregating the masked vector with masked vectors from other local parties allows decoding of the aggregated vector.

8. An electronic device to serve as a local party for privacy preserving information exchange between the local party and another electronic device to serve as an aggregator, wherein the aggregator exchanges information with a plurality of local parties including the local party, and wherein the exchanged information is decision tree information for decision tree learning, and wherein the aggregator is to generate a decision tree, the electronic device comprising:
 a processor and non-transitory machine-readable storage medium having stored instructions, which when executed by the processor, are capable of causing the electronic device to perform:
  storing a plurality of values in a two-dimensional (2D) vector, wherein a first dimension of the 2D vector is based on how many values are in the plurality of values, and wherein each position in the first dimension has one unique value within the plurality of values, wherein each unique value within the plurality of values is in a randomly selected position in a second dimension, and wherein the plurality of values comprises a first plurality of split point value candidates for at least one feature of the decision tree; and
  transmitting the 2D vector to the aggregator with masking for the aggregator to prevent the aggregator from decoding the 2D vector to determine the plurality of values transmitted by the local party, wherein aggregating each position of the masked 2D vector with corresponding positions of masked 2D vectors from other local parties allows unmasking of the plurality of values in the 2D vector without identifying the local parties from which the values originated;
  receiving a second plurality of split point value candidates from the aggregator; and
  transmitting quantile sketch information mapped to the second plurality of split point value candidates of the feature to the aggregator with masking to prevent the aggregator from decoding the quantile sketch information, wherein aggregating the masked quantile sketch information with quantile sketch information from other local parties allows decoding of the aggregated quantile sketch information.

9. The electronic device of claim 8, wherein the aggregator is to determine a single split point value for one node of the decision tree based on the aggregated 2D vector.

10. The electronic device of claim 8, wherein the first dimension of the 2D vector is equal to the number of the first plurality of split point value candidates, and wherein the second dimension of the 2D vector is no less than the number of local parties.

11. The electronic device of claim 8, wherein the plurality of split point value candidates each map to a sketch of data for the feature at the local party.

12. The electronic device of claim 8, wherein the instructions are capable of further causing the electronic device to perform:
 retransmitting one or more values upon a request from the aggregator, each of the values is stored in a randomized position within another vector, wherein each retransmission uses masking for the aggregator to prevent the aggregator from decoding the another vector, and wherein aggregating the masked vector with masked vectors from other local parties allows decoding of the aggregated vector.

13. A non-transitory machine-readable storage medium having stored instructions, which when executed by a processor of an electronic device, are capable of causing the electronic device to perform:
 storing a plurality of values in a two-dimensional (2D) vector, wherein a first dimension of the 2D vector is based on how many values are in the plurality of values, and wherein each position in the first dimension has one unique value within the plurality of values, and wherein each unique value within the plurality of values is in a randomly selected position in a second dimension, wherein the plurality of values comprises a first plurality of split point value candidates for at least one feature of a decision tree, wherein the electronic device to serve as a local party for privacy preserving information exchange between the local party and an aggregator, wherein the aggregator exchanges information with a plurality of local parties including the local party, and wherein the exchanged information is decision tree information for decision tree learning, and wherein the aggregator is to generate the decision tree;
 transmitting the 2D vector to the aggregator with masking for the aggregator to prevent the aggregator from decoding the 2D vector to determine the plurality of values transmitted by the local party, wherein aggregating each position of the masked 2D vector with corresponding positions of masked 2D vectors from other local parties allows unmasking of the plurality of values in the 2D vector without identifying the local parties from which the values originated;
 receiving a second plurality of split point value candidates from the aggregator; and
 transmitting quantile sketch information mapped to the second plurality of split point value candidates of the feature to the aggregator with masking to prevent the aggregator from decoding the quantile sketch information, wherein aggregating the masked quantile sketch information with quantile sketch information from other local parties allows decoding of the aggregated quantile sketch information.

14. The non-transitory machine-readable storage medium of claim 13, wherein the aggregator is to determine a single split point value for one node of the decision tree based on the aggregated 2D vector.

15. The non-transitory machine-readable storage medium of claim 13, wherein the first dimension of the 2D vector is equal to the number of the first plurality of split point value candidates, and wherein the second dimension of the 2D vector is no less than the number of local parties.

16. The non-transitory machine-readable storage medium of claim 13, wherein the plurality of split point value candidates each map to a sketch of data for the feature at the local party.

17. The non-transitory machine-readable storage medium of claim 13, wherein the instructions are capable of further causing the electronic device to perform:
 retransmitting one or more values upon a request from the aggregator, each of the values is stored in a randomized position within another vector, wherein each retransmission uses masking for the aggregator to prevent the aggregator from decoding the another vector, and wherein aggregating the masked vector with masked vectors from other local parties allows decoding of the aggregated vector.

* * * * *